United States Patent
Zhuo et al.

(10) Patent No.: US 11,079,508 B2
(45) Date of Patent: Aug. 3, 2021

(54) SYSTEM AND METHOD FOR MARINE SEISMIC MODELING

(71) Applicant: Chevron U.S.A. Inc., San Ramon, CA (US)

(72) Inventors: Lei Zhuo, Houston, TX (US); Thor Johnsen, Pleasanton, CA (US); Kevin John Davies, London (GB)

(73) Assignee: Chevron U.S.A. Inc., San Ramon, CA (US)

( * ) Notice: Subject to any disclaimer, the term of this patent is extended or adjusted under 35 U.S.C. 154(b) by 510 days.

(21) Appl. No.: 16/163,806

(22) Filed: Oct. 18, 2018

(65) Prior Publication Data
US 2020/0124754 A1    Apr. 23, 2020

(51) Int. Cl.
*G01V 1/30* (2006.01)
*G01V 1/38* (2006.01)

(52) U.S. Cl.
CPC .............. *G01V 1/308* (2013.01); *G01V 1/302* (2013.01); *G01V 1/305* (2013.01); *G01V 1/3808* (2013.01)

(58) Field of Classification Search
CPC ...... G01V 1/308; G01V 1/305; G01V 1/3808; G01V 1/302; G01V 2210/612; G01V 99/00
See application file for complete search history.

(56) References Cited

U.S. PATENT DOCUMENTS 9,720,131 B2    8/2017  Zhuo et al.
2020/0124754 A1*  4/2020  Zhuo ............... G01V 1/308

* cited by examiner

*Primary Examiner* — Daniel Pihulic
(74) *Attorney, Agent, or Firm* — Marie L. Clapp

(57) ABSTRACT

A method is described for seismic modeling implemented on a computer system including multiple computer nodes, which includes receiving, at a computer processor, a 4D speed of sound in water library and a marine seismic survey geometry; creating, via the computer processor, a full survey 3D Earth model for each seismic shot time based on the 4D speed of sound in water library to generate a set of dynamic 3D Earth models; simulating 4D seismic shots for the set of dynamic 3D Earth models by simulating multiple shots on each node to generate a set of 4D seismic shot gathers; and outputting the 4D seismic shot gathers.

7 Claims, 4 Drawing Sheets

SYSTEM AND METHOD FOR MARINE SEISMIC MODELING

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for modeling seismic energy propagation in a marine seismic survey and, in particular, to a method for modeling seismic energy propagation including dynamic (i.e. constantly changing) speed of sound in the water column above the subsurface volume of interest.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

In marine surveys, the seismic sources may be an array (e.g., air guns) pulled by a vessel. In general, the seismic data used for seismic imaging is recorded by seismic sensors pulled by the same or other vessels in the form of Towed Streamers (TS), by Ocean Bottom Sensors (OBS), or by Vertical Seismic Profile (VSP) sensors in the water column or down hole. In a marine survey, the seismic waves travel through the water column (i.e., the water layer between the sea surface and the sea bottom) before and after they travel through the subsurface geologic formations.

Seismic data is processed to create seismic images that can be interpreted to identify subsurface geologic features including hydrocarbon deposits. The processing may include data conditioning methods (e.g., deghosting, noise attenuation, spectral enhancement, etc.), velocity estimation (e.g., semblance analysis, tomography, etc.), and seismic imaging (e.g., time migration, depth migration, reverse time migration, etc.). The seismic images that are produced are a representation of the physical subsurface and can be used to identify hydrocarbon reservoirs. The seismic images may be used to control well drilling in order to drill a well bore that will produce hydrocarbons from the subsurface reservoir.

The production of hydrocarbons causes changes in the elastic parameters of the earth. These changes may occur due to water displacing oil (or vice versa), water displacing gas (or vice versa), or gas displacing oil (or vice versa), within the reservoir interval. In other cases, the changes in the elastic parameters may occur due to enhanced hydrocarbon recovery operations, $CO_2$ injection, or clathrate dissociation from solid to gas. Time-lapse (4D) seismic data is acquired to compare seismic data at different times via two or more seismic surveys, a seismic survey at time one ($T_1$) and another seismic survey from time two ($T_2$), conducted months or years apart. The differences in the seismic responses for $T_1$ and $T_2$ are at least partially due to fluid movement and/or pressure changes due to production or injection of water or gas. Conventionally, these differences in seismic response are qualitatively interpreted relative to modeled response behaviors due to fluid and pressure changes. Typically, the seismic survey from $T_1$ is referred to as the baseline survey, and the seismic survey from $T_2$ is referred to as the monitor survey. However, in general 4D seismic data makes the assumption that the only physical changes in the survey area are caused by the production or injection of water or gas. In the case of marine 4D seismic data, this assumption fails.

Marine 4D seismic data measures differences in the reservoir interval caused by production or injection as well as differences in propagation path caused by dynamic speed of sound in water. Conventional 4D seismic methods assume that the seismic velocity through the water column is uniform throughout the water column and unchanging between the baseline and monitor surveys. Simple understanding of oceanography refutes this assumption. It is well known that differences in temperature and salinity throughout the water column impact the velocity of seismic waves, not only affecting their traveltime but also redirecting (i.e. bending) them. The ocean currents may significantly change water column temperature and salinity properties on an hourly basis, so variation within a survey and between baseline and monitor surveys are subject to seismic variation. These differences in the water column properties are difficult to handle in processing and result in decreased 4D signal to noise. Since 4D seismic analysis is used to identify the effectiveness of hydrocarbon production and to control production and injection rates for a hydrocarbon reservoir, the differences in the water column are a significant problem.

Time-lapse (4D) seismic plays a vital role in monitoring reservoir production, locating bypassed oil and optimizing well locations. 4D synthetic seismic modeling leverages the advantage of having the "ground truth" (i.e. synthetic earth models) to benchmark the quality and cost of 4D seismic acquisition and processing scenarios and result in improved decisions for the field seismic surveys. Improved decisions in field seismic surveys result in seismic data that is more suitable for 4D analysis.

It is possible to generate synthetic seismic data using a technique called seismic modeling. In seismic modeling, synthetic seismic energy is injected into an earth model that includes at least the compressional wave velocity ($V_p$). When the earth model includes a water layer, conventional seismic modeling assumes that the water velocity is constant in both space and time, generally setting it to around 1500 m/s. This simplification may be acceptable when modeling a single dataset, but as explained above is not sufficient when modeling both a baseline and monitor survey. During Ocean Bottom Sensor (OBS) seismic acquisition, seismic wave speed in the water can vary in 3D space and time on a shot-by-shot basis. Conventional synthetic seismic simulation uses reciprocity to propagate wave field from near water bottom receiver (OBS) to near surface source efficiently, which assumes a static water column.

The synthetic seismic datasets can be processed and imaged in the same way as the recorded seismic datasets as described above. However, synthetic baseline and monitor datasets generated in conventional seismic modeling will not include the differences that would be seen in the recorded seismic datasets caused by the changes in the water column.

The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, adjusting production and/or injection rates in wells, preventing subsurface integrity issues by planning proper casing and cementation strategies, and selecting and purchasing appropriate completion and production equipment.

There exists a need for a method for seismic modeling that can account for dynamic water velocities, thereby improving decisions made for field seismic surveys, ultimately improving the recorded seismic data, the processing of the seismic data and the imaging of the seismic data which will allow better seismic interpretation of potential hydrocarbon reservoirs.

SUMMARY

In accordance with some embodiments, a method of seismic modeling implemented on a computer system including multiple computer nodes which includes receiving, at a computer processor, a 4D water velocity library and a marine seismic survey geometry; creating, via the computer processor, a full survey 3D earth model for each seismic shot time based on the 4D water velocity library to generate a set of dynamic 3D earth models; simulating 4D seismic shots for the set of dynamic 3D earth models by simulating multiple shots on each computer node to generate a set of 4D seismic shot gathers; and outputting the 4D seismic shot gathers is disclosed.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of seismic modeling. These embodiments are designed to be of particular use for seismic modeling of subsurface volumes overlain by a dynamic water column.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Time-lapse (4D) seismic data is important for assessing changes in the fluid content of the subsurface due to hydrocarbon production. As explained previously, although recorded seismic data must also contain differences caused by changes in the water column, conventional methods of processing 4D seismic data and modeling 4D seismic data assume that the water column does not change between surveys, or oftentimes that the water column is uniform throughout. Being able to assess how much of a difference may be seen in 4D seismic data due to changes in the water column allows those of skill in the art to determine how reliably differences seen in recorded seismic data can be related to changes in the subsurface due to hydrocarbon production.

The present invention includes embodiments of a method and system for improved hydrocarbon identification and production using 4D seismic data. The method uses a computationally efficient method for seismic modeling with a dynamic water column that is performed using a high-performance computing (HPC) cluster. The synthetic seismic data produced can be processed and analyzed in comparison to recorded 4D seismic data to determine whether the recorded seismic data can be reliably used for identifying changes in the subsurface, allowing changes in hydrocarbon production methods including drilling additional wells and enhanced production methods such as steam or water injection.

Figure 1:
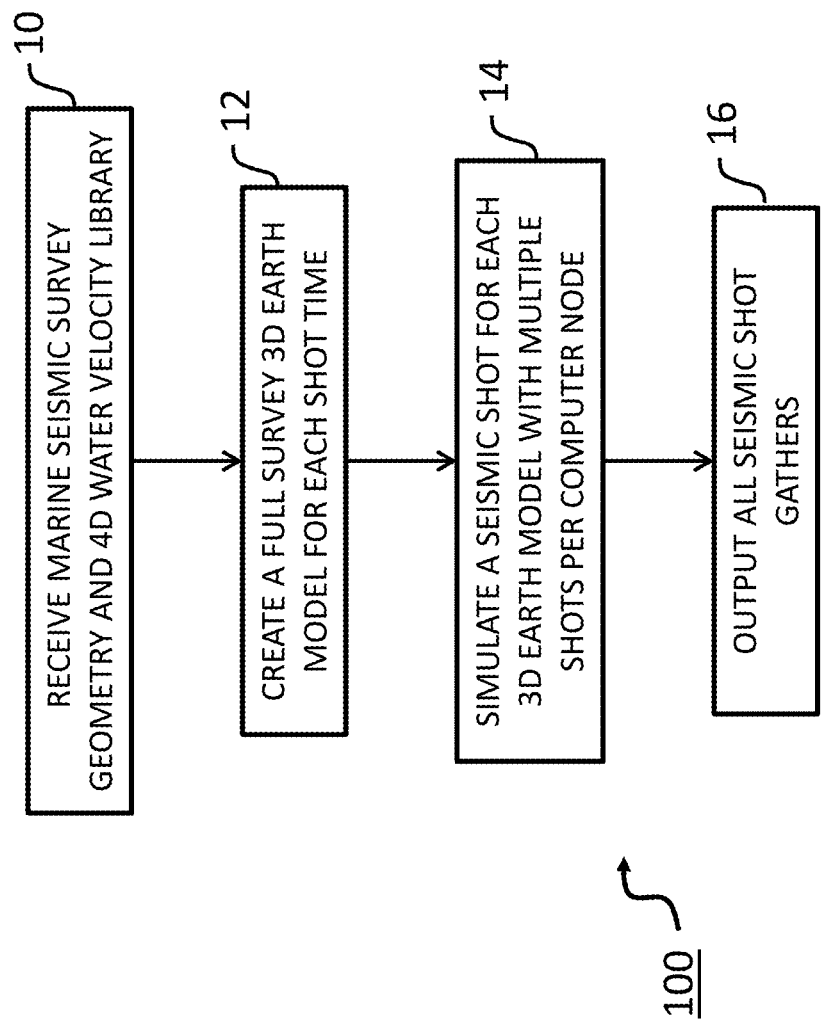
FIG. 1 illustrates a flowchart of a method of seismic modeling including accounting for a dynamic water column, in accordance with some embodiments.

FIG. 1 illustrates a flowchart of a method 100 for seismic modeling including a dynamic water column. At operation 10, a marine seismic survey geometry and a 4D water velocity library are received at a computer processor. In some embodiments, the marine seismic survey geometry may match that of an actual marine seismic survey performed in the area of interest. It may be, for example, an Ocean Bottom Sensor (OBS) geometry, with the OBS locations and source (i.e. shot) locations indicated.

At operation 12, a full survey 3D earth model is created for each shot time. The full survey 3D earth model includes the rock properties (e.g., P-wave velocity ($V_p$), S-wave velocity ($V_s$), and density) for the subsurface volume of interest (e.g., the hydrocarbon reservoir), the overburden (e.g., the subsurface around and above the hydrocarbon reservoir), and the water column.

Figure 3:
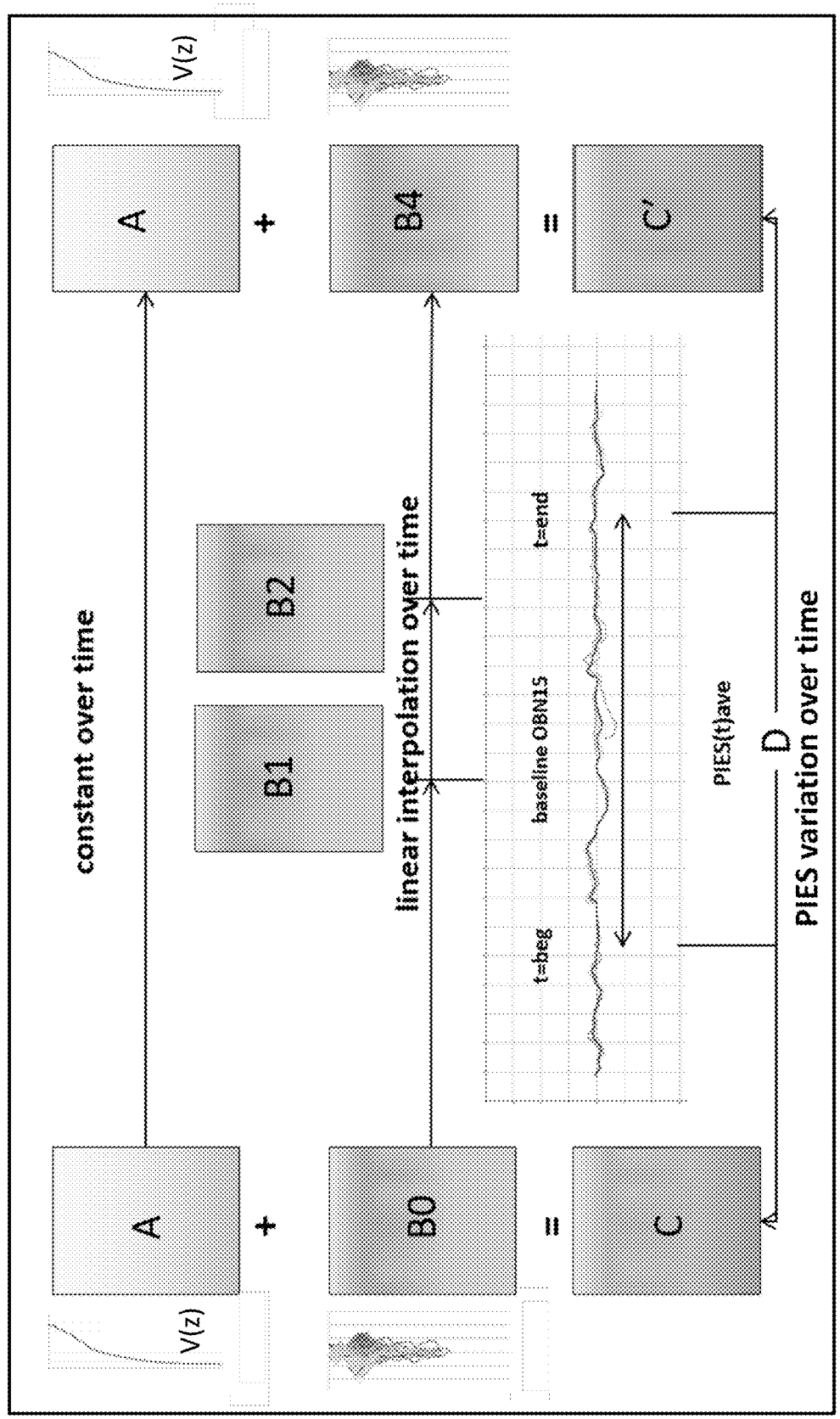
FIG. 3 illustrates a step of an embodiment.

FIG. 3 illustrates how 4D water velocity library may be generated from field measurements. The "back-bone" velocity as a function of depth (z)(V(z)) water velocity function is derived by averaging the field SVP (Sound Velocity Profile) measurements, represented in FIG. 3 as A. The V(z) function is kept constant for either baseline or monitor survey but varies between two surveys. Multiple "seed cubes" $B_i(x,y,z,t)$ are derived from SVPs to represent the subtle and high-frequency variations between shots, represented in FIG. 3 as cubes B0, B1, B2, B4. For a given shot, the specific water velocity variation is derived by interpolating between two "seeds" cubes with a scalar calculated based on the acquisition time for this shot. Additional components of the dynamic variations can be derived from field PIES (Pressure Inverted Echo Sounding) measurements. The combination of "back-bone" V(z) and high-frequency variations V(x,y,z,t) from field SVP and PIES represents the final 3D water velocity for a specific shot record in a marine seismic survey, represented in FIG. 3 as C and C'. This completes the first part of the Earth model building for simulating dynamic water column impact on 4D seismic imaging and seeking the right 4D seismic acquisition and imaging solutions to detect the true 4D changes in overburden and reservoir.

Figure 4:
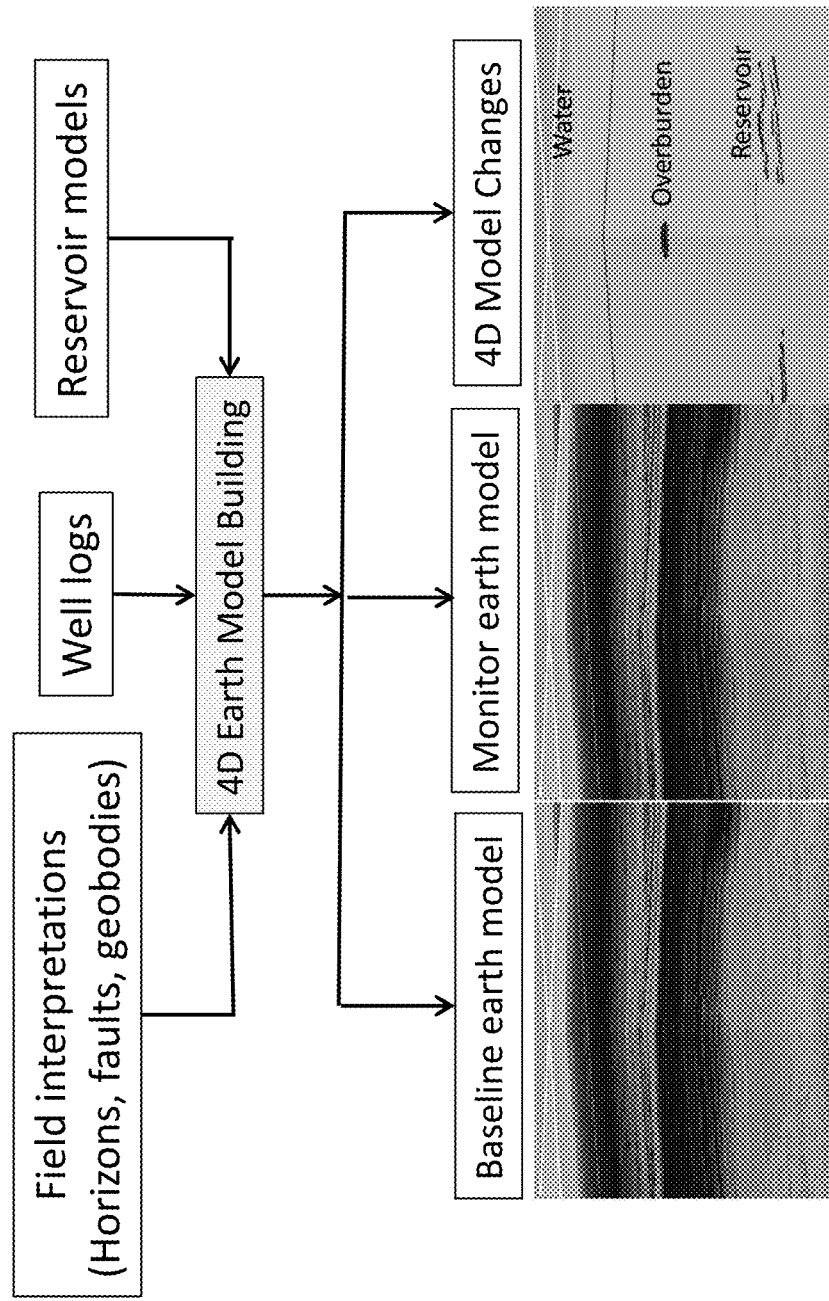
FIG. 4 illustrates a step of an embodiment.

After building dynamic water velocity model, the next step of the earth model building is to build "background" sediment model and add 4D changes in overburden and reservoir which may be done, for example, by the methods described in U.S. Pat. No. 9,720,131, as illustrated by FIG. 4. The "background" structure and stratigraphy earth model is built from interpreted horizons, faults and geobodies, with rock properties populated from well logs and geostatistical methods. Reservoir simulation models are incorporated to the background model to high-grade the reservoir cells and create the 4D earth model. The 4D change at overburden can be derived from a subsurface geomechnical model and added to the final earth model.

Referring again to FIG. 1, at operation 14, a seismic shot is simulated via seismic modeling for its respective 3D Earth model. The seismic modeling may be performed, for example, as finite-difference modeling. The seismic modeling is done on an HPC cluster, allowing much better computational efficiency than conventional seismic modeling methods because multiple shots may be modeled simultaneously on the same node (e.g., a Graphical Processing Unit (GPU) node). Although FIG. 1 shows operation 12 occurring before operation 14, it is not required that all of the 3D earth models be created prior to beginning the simulation of the seismic shots.

Conventional approaches of simulating ocean bottom sensor seismic surveys take advantage of the static water column velocity and so called "reciprocity" by propagating seismic waves starting from ocean bottom sensors. Due to having far fewer ocean bottom sensors than surface shots, modeling from ocean bottom sensors enables significant cost saving than modeling from surface shots. However, in a more realistic scenario, such as dynamic water column, the "reciprocity" principle breaks down since water velocity changes for each shot. For simulating dynamic water marine seismic acquisition, propagating the seismic wave starting from the surface shots is a requirement. Due to the overwhelming number of surface shots to acquire, conventional methods for simulating 4D dynamic water seismic surveys are prohibitively expensive and very likely unaffordable. The present invention provides significant improvement to the simulation computations, greatly reducing the computational cost. Leveraging the more relaxed memory requirement by modeling from surface shot, the novel finite difference modeling implemented in this invention solves the turnaround challenge by modifying the parallel architecture and memory allocation scheme to fit multiple shots on one node (for example, a Graphical Processing Unit GPU) thereby allowing the node to run multiple shots simultaneously. The implementation reduces the production turnaround time by at least 4 times and makes simulation of dynamic water seismic surveys possible. In an embodiment, to configure the machine to run N joblets (N is the number of joblets desired), the master process forks N worker processes. Each worker process uses the GPUs assigned to it to complete tasks given to it by a dynamic load balancing system. The worker processes operate independently of each other and work on a single task at the time. GPUs are assigned to worker processes by setting an environment variable such as CUDA_VISIBLE_DEVICES before the worker process is forked, this configures the CUDA driver to only see the GPUs that are assigned to the worker. The master process waits for all the worker processes to finish, a worker finishes when the dynamic load balancing system decides there are no more remaining tasks. When all the worker processes are finished, the master process finishes, when all master processes finish, the job changes status to "Completed" in the processing system.

Figure 2:
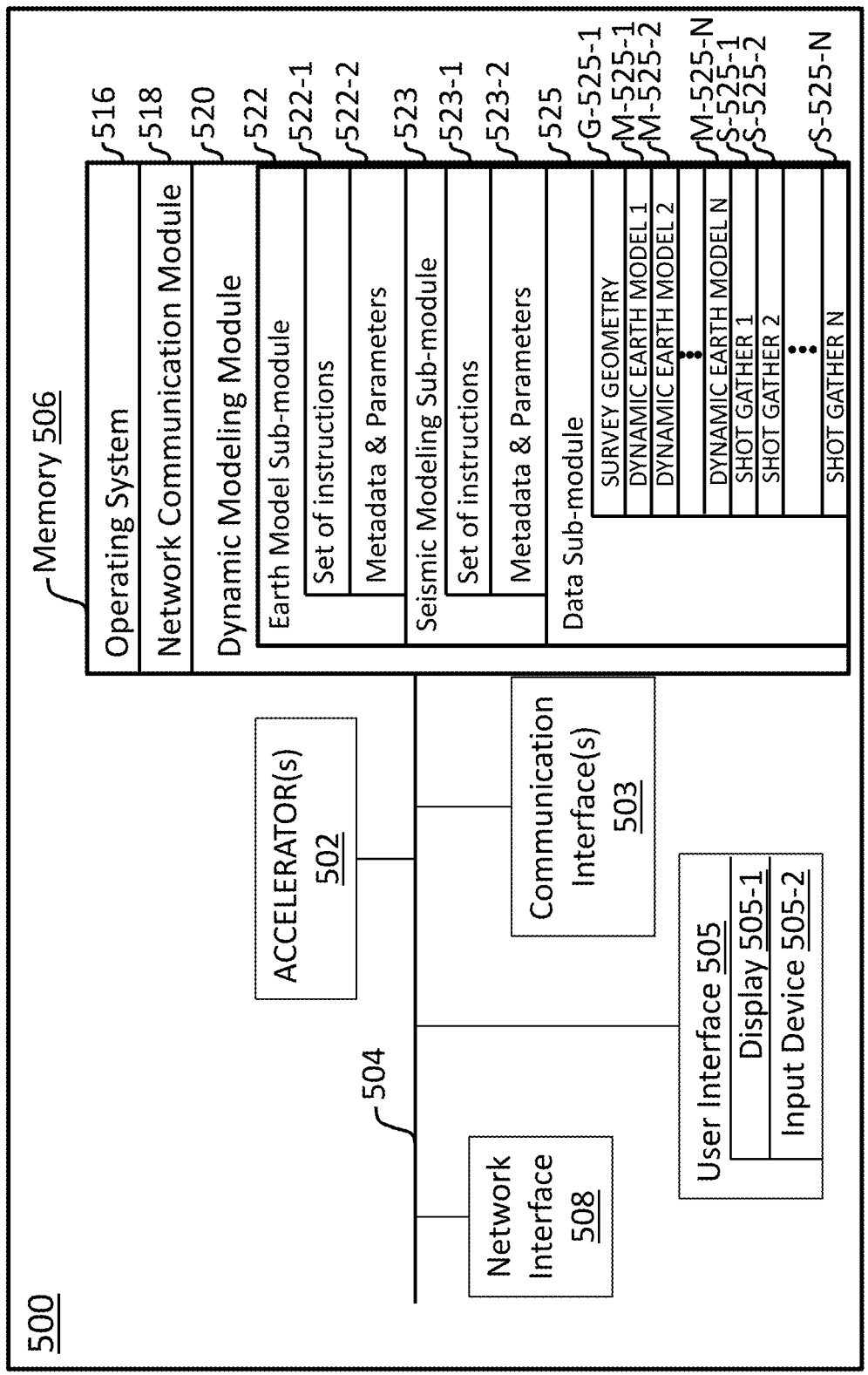
FIG. 2 is a block diagram illustrating a seismic modeling system, in accordance with some embodiments.

FIG. 2 is a block diagram illustrating a seismic modeling system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic modeling system 500 includes one or more processing units (CPUs) 502, one or more network interfaces 508 and/or other communications interfaces 503, memory 506, and one or more communication buses 504 for interconnecting these and various other components. The seismic modeling system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and dynamic modeling module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the dynamic modeling module 520 executes the operations of method 100. Dynamic modeling module 520 may include data sub-module 525, which handles the survey geometry G-525-1, the dynamic earth models M-525-1 through M-525-N, and the shot gathers S-525-1-S-525-N. This seismic data is supplied by data sub-module 525 to other sub-modules.

Earth model sub-module 522 contains a set of instructions 522-1 and accepts metadata and parameters 522-2 that will enable it to execute operation 12 of method 100. The seismic modeling sub-module 523 contains a set of instructions 523-1 and accepts metadata and parameters 523-2 that will enable it to contribute to operation 14 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 2) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of seismic modeling implemented on a computer system including multiple computer nodes, comprising:
   a. receiving, at a computer processor, a 4D water velocity library and a marine seismic survey geometry;
   b. creating, via the computer processor, a full survey 3D Earth model for each seismic shot time based on the 4D water velocity library to generate a set of dynamic 3D Earth models;
   c. simulating 4D seismic shots for the set of dynamic 3D Earth models by simulating multiple shots on each computer node to generate a set of 4D seismic shot gathers; and
   d. outputting the 4D seismic shot gathers.

2. The method of claim 1 wherein the 4D water velocity library is derived from field measurements.

3. The method of claim 1 wherein the simulating 4D seismic shots is done by forward modeling using finite difference modeling.

4. The method of claim 3 wherein the finite difference modeling includes modifying the parallel architecture and memory allocation of a computer node to fit multiple shots on the computer node.

5. The method of claim 1 further comprising using the 4D seismic shot gathers to evaluate improved seismic survey parameters.

6. A computer system, comprising:
one or more processors;
memory; and
one or more programs, wherein the one or more programs are stored in the memory and configured to be executed by the one or more processors, the one or more programs including instructions that when executed by the one or more processors cause the system to:
   a. receive, at a computer processor, a 4D water velocity library and a marine seismic survey geometry;
   b. create, via the computer processor, a full survey 3D earth model for each seismic shot time based on the 4D water velocity library to generate a set of dynamic 3D earth models;
   c. simulate 4D seismic shots for the set of dynamic 3D Earth models by simulating multiple shots on each node to generate a set of 4D seismic shot gathers; and
   d. output the 4D seismic shot gathers.

7. A non-transitory computer readable storage medium storing one or more programs, the one or more programs comprising instructions, which when executed by an electronic device with one or more processors and memory, cause the device to
   a. receive, at a computer processor, a 4D water velocity library and a marine seismic survey geometry;
   b. create, via the computer processor, a full survey 3D Earth model for each seismic shot time based on the 4D water velocity library to generate a set of dynamic 3D Earth models;
   c. simulate 4D seismic shots for the set of dynamic 3D earth models by simulating multiple shots on each node to generate a set of 4D seismic shot gathers; and
   d. output the 4D seismic shot gathers.

\* \* \* \* \*